March 3, 1970 K. M. ALLEN ET AL 3,498,070
METHOD AND APPARATUS FOR QUICK FREEZING FOOD PRODUCTS
Original Filed Sept. 23, 1964 8 Sheets-Sheet 1

INVENTORS.
KENNETH M. ALLEN
CHESTER H. HARPER
BY
BUCKHORN, BLORE, KLARQUIST & SPARKMAN

ATTORNEYS

March 3, 1970 K. M. ALLEN ET AL 3,498,070
METHOD AND APPARATUS FOR QUICK FREEZING FOOD PRODUCTS
Original Filed Sept. 23, 1964 8 Sheets-Sheet 5

INVENTORS.
KENNETH M. ALLEN
CHSTER H. HARPER
BY
BUCKHORN, BLORE, KLARQUIST & SPARKMAN

ATTORNEYS

March 3, 1970     K. M. ALLEN ET AL     3,498,070
METHOD AND APPARATUS FOR QUICK FREEZING FOOD PRODUCTS
Original Filed Sept. 23, 1964     8 Sheets-Sheet 6

INVENTORS.
KENNETH M. ALLEN
CHESTER H. HARPER
BY
BUCKHORN, BLORE, KLARQUIST & SPARKMAN

ATTORNEYS

March 3, 1970  K. M. ALLEN ET AL  3,498,070
METHOD AND APPARATUS FOR QUICK FREEZING FOOD PRODUCTS
Original Filed Sept. 23, 1964  8 Sheets-Sheet 7

KENNETH M. ALLEN
CHESTER H. HARPER
INVENTORS.
BY BUCKHORN, BLORE, KLARQUIST & SPARKMAN
ATTORNEYS

March 3, 1970   K. M. ALLEN ET AL   3,498,070
METHOD AND APPARATUS FOR QUICK FREEZING FOOD PRODUCTS
Original Filed Sept. 23, 1964   8 Sheets-Sheet 8

KENNETH M. ALLEN
CHESTER H. HARPER
INVENTORS.

BY BUCKHORN, BLORE, KLARQUIST & SPARKMAN
ATTORNEYS

United States Patent Office 3,498,070
Patented Mar. 3, 1970

3,498,070
METHOD AND APPARATUS FOR QUICK FREEZING FOOD PRODUCTS
Kenneth M. Allen and Chester H. Harper, both of P.O. Box 352, Newberg, Oreg. 97132
Continuation of application Ser. No. 401,758, Sept. 23, 1964, which is a continuation-in-part of application Ser. No. 310,800, Sept. 23, 1963. This application June 30, 1969, Ser. No. 845,603
Int. Cl. F25d 17/02, 25/04
U.S. Cl. 62—64          22 Claims This application is a continuation of application Ser. No. 401,758, Sept. 23, 1964, which is a continuation-in-part of application Ser. No. 310,800, Sept. 23, 1963, for "Method and Apparatus for Quick Freezing Food Products" now abandoned.

This invention relates to methods of and apparatus for quick freezing food products, and more particularly to methods of and apparatus for freezing food products with liquid nitrogen.

In freezing food products such as, for example, strawberries, raspberries, oysters and the like, it has been discovered that it is advantageous to freeze the food products very quickly and then pack them in packages or in containers. One way of accomplishing this is to apply liquid nitrogen at substantially atmospheric pressure to the food products for a short period of time. However, hitherto it has been difficult to freeze the food products without cracking the food products and without using excess liquid nitrogen. Also, liquid nitrogen is at a temperature of about −322° Fahrenheit, and is quite dangerous at this temperature and also tends to cause mechanisms used therewith to become brittle. Also, the low temperature and frost accumulating on the mechanisms frequently causes faulty operation thereof. It would be highly desirable to efficiently and safely freeze food products with liquid nitrogen without cracking the outer surfaces of the food products.

An object of the invention is to provide new and improved methods of and apparatus for quick freezing food products.

Another object of the invention is to provide a method and an apparatus in which a food product and liquid nitrogen are first brought into contact with each other for a predetermined period of time and then cold nitrogen gas evolved from the liquid nitrogen is applied to the food product for a further period of time.

Another object of the invention is to provide a method and an apparatus in which a food product is precooled, then is partially frozen by immersing it in liquid nitrogen for a first predetermined period of time and thereafter is maintained in cold nitrogen gas for a further predetermined period of time to complete the freezing thereof.

Yet another object of the invention is to provide methods of and apparatus for quick freezing food products in which the food products are immersed with an open, foraminous container into liquid nitrogen and then are removed from the liquid nitrogen and are packaged.

Still another object of the invention is to provide methods of and apparatus for freezing food products with liquid nitrogen without danger to operators thereof.

Yet another object of the invention is to provide methods of and apparatus for freezing food products wherein food products are precooled and are automatically fed into a foraminous container immersed in a pool of liquid nitrogen and the container discharges the food products onto a conveyor trough which advances the food products along a post-cooling zone in which cold nitrogen gas evaporated from the liquid nitrogen travels along the conveyor trough to further freeze the food products, after which the cold nitrogen gas is utilized first to precool other food products and then to expel air from the food products as the products are packaged.

The invention provides methods of and apparatus for quick freezing food products in which the food products are precooled, then are brought into contact with liquid nitrogen to partially freeze them and then the freezing is completed by applying cold nitrogen gas to the food products. In a method forming one embodiment of the invention, precooled food products and liquid nitrogen are brought into contact with one another for a sufficient period of time to freeze a thick layer of the food product, the food product is removed from the liquid nitrogen, and cold nitrogen gas evolved from the liquid nitrogen is kept in contact with the food product for a sufficient period of time to freeze the food product completely therethrough. In a more specific form of the invention, the food products are placed in an open foraminous container immersed in a pool of liquid nitrogen, and after freezing the container removes the food products from the liquid nitrogen, and discharges the partially frozen food products into a generally horizontal conveyor trough, which conveys the food products away from the pool of liquid nitrogen. Cold nitrogen gas escaping from the liquid nitrogen settles into the conveyor trough and freezes the food products in the bottom of the conveyor trough sufficiently slowly to prevent cracking or shattering of the food products. At one end of the conveyor trough the nitrogen gas may be pulled from the conveyor trough and utilized to pre-cool other food products before freezing thereof, after which the nitrogen gas may be inserted into packages of the frozen food products to keep air and moisture from the food products.

A complete understanding of the invention may be obtained from the following detailed description of methods of and apparatus for quick freezing food products forming specific embodiments thereof, when read in conjunction with the appended drawings thereof, in which.

Referring now in detail to the drawings, there is shown in FIGS. 1 to 13 an apparatus for quick freezing food products 20 such as, for example, strawberries, raspberries, sliced apples, asparagus, string beans, cheese and potatoes, oysters, shrimp and the like, in accordance with a method forming one embodiment of the invention. The food products are first precooled from room temperature to uniform temperature throughout the entire mass of each particle thereof near the freezing point thereof, at least as low as about 40° F. or less, then feed conveyors 22 supply the precooled food products 20 in measured quantities to lightweight pans or containers 24 each having a screen or foraminous bottom 26 which is immersed in a pool 28 of liquid nitrogen in an elongated, insulated trough or tank 30 receiving all of the pans therein in side-by-side relation. The food products are immersed in the uppermost portion of the pool 28, and this upper portion of the liquid nitrogen freezes a shell of each food product of a thickness about one-quarter of the diameter of each food product. The heat extracted in so freezing the food products causes the upper portion of the pool of liquid nitrogen surrounding the food products to boil, which agitates the food products to prevent freezing them together and forms cold nitrogen gas in the pan. After the food products have been immersed in the liquid nitrogen for a period just sufficient to form the frozen shells and to produce sufficient cold nitrogen gas for further freezing and precooling functions described hereinbelow, the pans are tilted to gently discharge the food products and the cold nitrogen gas in the pans into a conveyor trough 40. The conveyor trough is reciprocated to gently slide the food products therealong to complete the freezing thereof in the cold nitrogen gas in the trough. The frozen food products with some of the cold gas then are placed in a container or packaged and the rest of the still cold nitrogen gas is used to cool pre-cooling water which is applied to other food products to wash and pre-cool the latter prior to freezing thereof by the method just described. Part of the nitrogen gas can be kept with the frozen food products in packaging the frozen food products to prevent any substantial contact with the products by air and/or moisture. The packages are then sealed to keep the food products in the nitrogen gas to prevent any discoloration thereof. The nitrogen gas used in pre-cooling is cooled, condensed and is again supplied to the pool 28.

The method just described uses a minimum of liquid nitrogen and freezes the food products without cracking or shattering the food products, which has been impossible hitherto in freezing with liquid nitrogen food products having solutions high in sugar content like strawberries, raspberries, and other berries and fruit. The above described method effects the freezing of berries without such cracking or shattering because it first pre-cools the berries to a near freezing temperature, then rapidly freezes only the outer shell in the liquid nitrogen, and then relatively slowly extracts the heat from the high sugar content, initially unfrozen, central portions of the berries. The method uses a minimum of liquid nitrogen also because the time of immersion of the berries in the liquid nitrogen to partially freeze the berries is just sufficient to form an amount of cold nitrogen gas slightly greater than that required to complete the freezing thereof, cool each entire berry to about −30° F. and then cool a quantity of the washing and pre-cooling water sufficient to pre-cool subsequent berries to the near freezing temperature, most of the excess gas being used to package the frozen food products. In freezing berries, cracking or shattering of the berries is prevented by precooling the berries to near their freezing temperature, by fast freezing of only the outer shell and by more slowly freezing the remainder of the berries. Normally, pre-cooling the berries extracts from 25 to 30 percent of the total heat to be removed therefrom, the immersion in liquid nitrogen takes out about 45 to 50 percent of the total removed heat and the cold nitrogen gas removes the remaining 25 to 30 percent of this heat.

Figure 3:
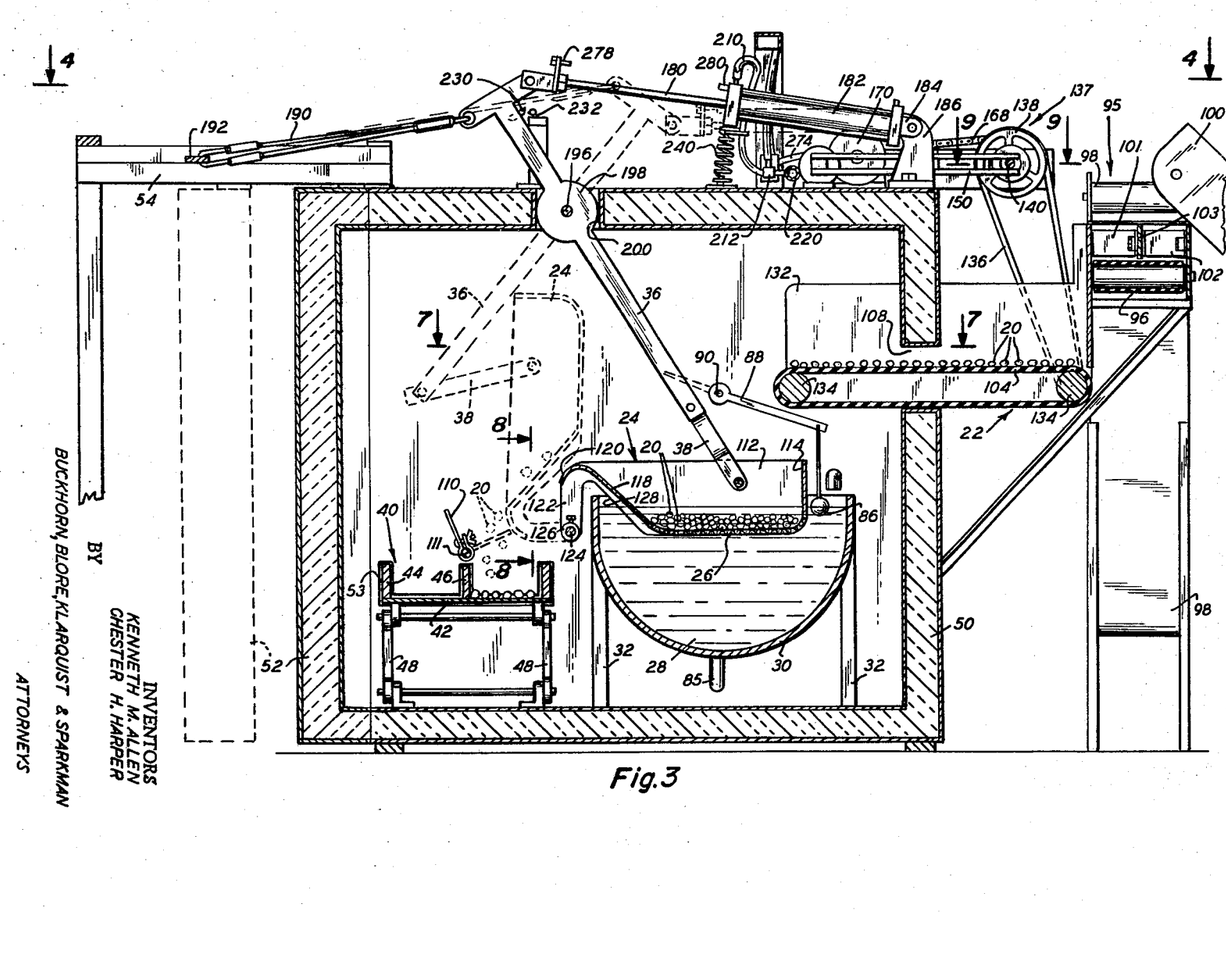
FIG. 3 is an enlarged, vertical section taken substantially along line 3—3 of FIG. 2.
Figures 4, 5, 6:
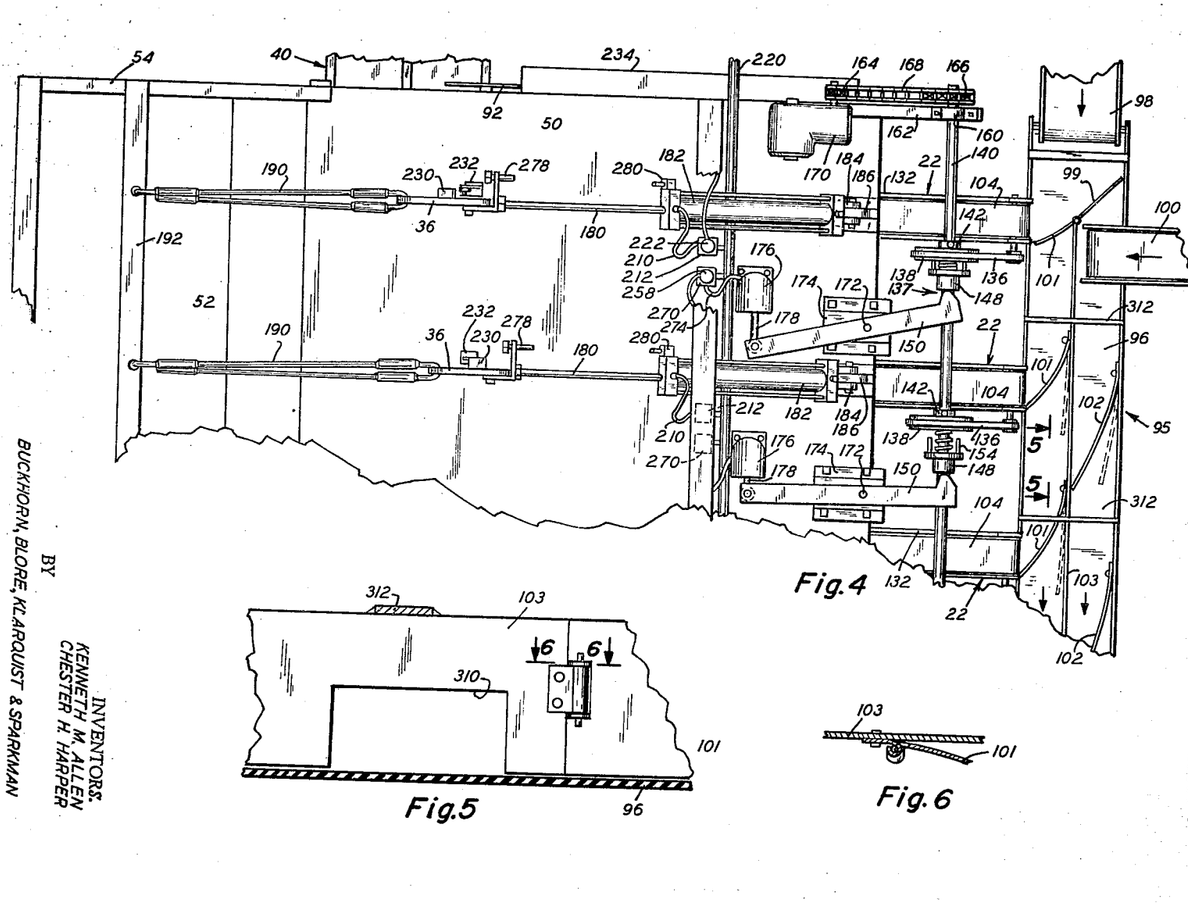
FIG. 4 is an enlarged, fragmentary, top plan view of the apparatus taken substantially along line 4—4 of FIG. 3.
FIG. 5 is an enlarged, fragmentary, vertical section taken substantially along line 5—5 of FIG. 4.
FIG. 6 is an enlarged, fragmentary, horizontal section taken substantially along line 6—6 of FIG. 5.
Figure 7:
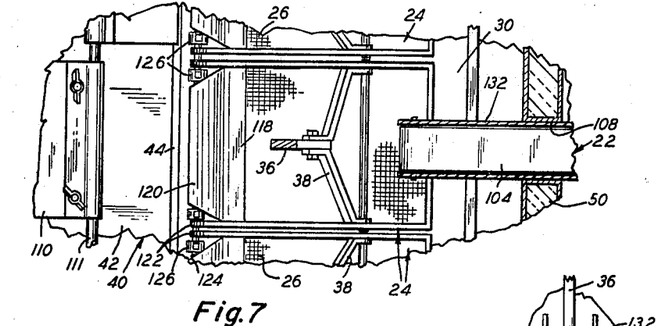
FIG. 7 is an enlarged, fragmentary, horizontal section taken substantially along line 7—7 of FIG. 3.
Figure 8:
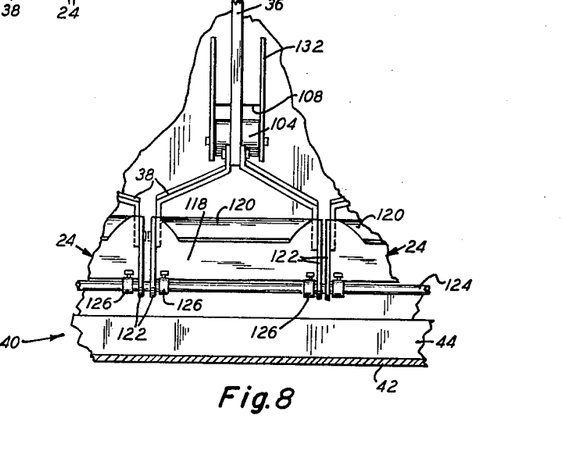
FIG. 8 is an enlarged, fragmentary, vertical section taken substantially along line 8—8 of FIG. 3.
Figure 9:
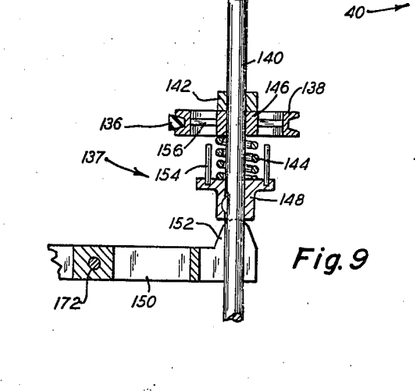
FIG. 9 is an enlarged, fragmentary, horizontal section taken substantially along line 9—9 of FIG. 3.

Each pan 24 is shallow and is composed of thin stainless steel with the bottom portion perforated. The pan receives the food products in the uppermost portion of the liquid nitrogen, and the nitrogen surrounding the food products boils vigorously to agitate the food products and keep each food product separated from the others. The tank 30 is supported by legs 32. After the food products have been immersed in the liquid a predetermined period of time, in the order of several seconds, sufficient to freeze each food product to a depth such that there is a thick, outer envelope portion or layer of each food product frozen, the thickness of the frozen layer being preferably about one-quarter of the diameter of the food product and not as thick as to cause cracking or shattering of the food product, a wood lever 36 is pivoted from its full line position, as shown in FIG. 3, to the broken line position thereof. In so moving, the lever 36 swings the pan 24 by means of a yoke-like link 38 from the full line, immersed position thereof to the broken line position to discharge the partially frozen food products 20 and cold nitrogen gas into the conveyor trough 40 having an aluminum bottom 42 and wood sides 44. The conveyor has a middle partition 46 and is supported by wood links 48 in a generally horizontal position. The wood of the levers 36 and links 48 does not become brittle at the low temperature, and is impregnated with olive oil to waterproof these parts. Olive oil also is applied to all the other wood parts of the apparatus.

The tank 30 and the pans are mounted in an insulating enclosure 50 having a door 52 movable along guides 54 between an open position and a closed position, and the conveyor trough 40 extends substantially horizontally, through the enclosure 50, through an entrance opening 53 and an exit enclosure or tunnel 56 in which may be termed a "post cooling" or "post freezing" zone. The liquid nitrogen, which is at substantially atmospheric pressure in the enclosure 50, is near the boiling point thereof, which is about −322° F., and the very cold nitrogen gas boiled therefrom in freezing flows over the sides of the tank 30 and fills at least the lower portion of the enclosure 50 and falls into the conveyor trough 40 from one side of the tank. The very cold nitrogen gas thus formed travels along the conveyor trough, which is upwardly facing. The nitrogen gas, being heavier than air, flows along the tunnel 56 to the righthand end thereof, as viewed in FIG. 1, and further cools the food products to complete the freezing and cooling thereof. The conveyor trough is provided with a screen outlet 58 in the bottom thereof near the exit end of the trough to permit most of the nitrogen gas to drop into a slightly lower pressure area directly therebelow. The still cold gas is pulled into an exit conduit 60 connected to the inlet of a pump 63 (FIG. 13).

The conveyor trough 40 (FIG. 1) is reciprocated at a rate of from about sixty cycles per minute to about one hundred twenty cycles per minute by a drive 62 and is supported by inclined links 48. Certain features of the conveyor trough 40, the drive 62 and links 48 are disclosed and claimed in our copending application, Ser. No. 303,599, filed Aug. 21, 1963, and entitled "Mechanically Operated Reciprocating Conveyors," now Patent 3,253,-700, and the drive 62 moves the conveyor trough to give the food products therein a gentle, tossing action. The tossing action slides food products along the trough with a gentle action, and this movement of the food products agitates the nitrogen gas sufficiently to mix the portions of the gas warmed by heat from the food products with the colder portions of the gas to efficiently utilize the cooling potential of the gas and prevent warmed gas from insulating the food products.

Figure 1:
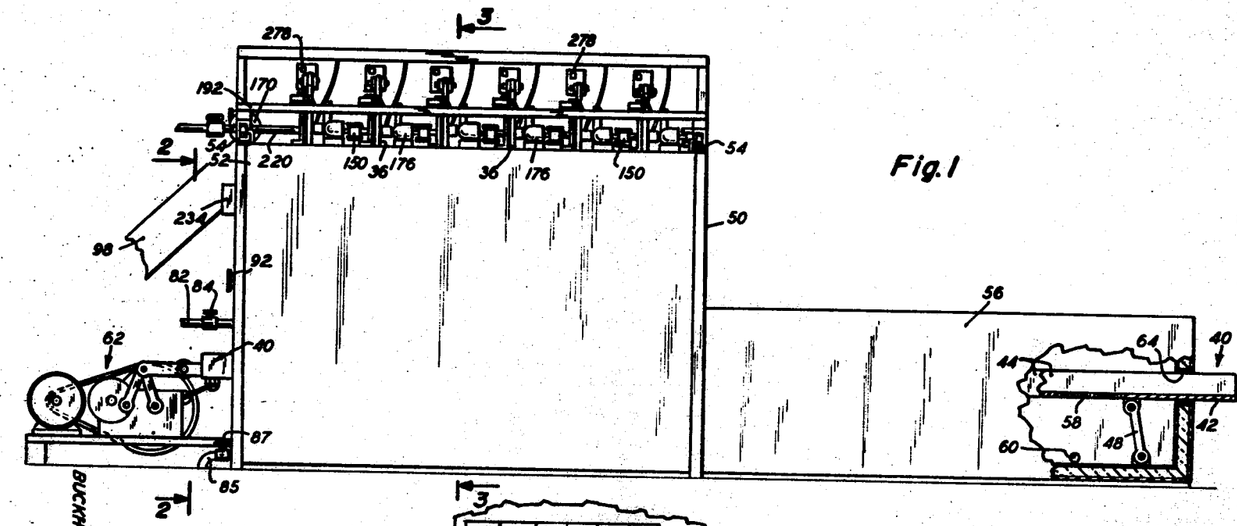
FIG. 1 is a fragmentary, front elevation view of an apparatus for effecting a method forming one embodiment of the invention.
Figure 2:
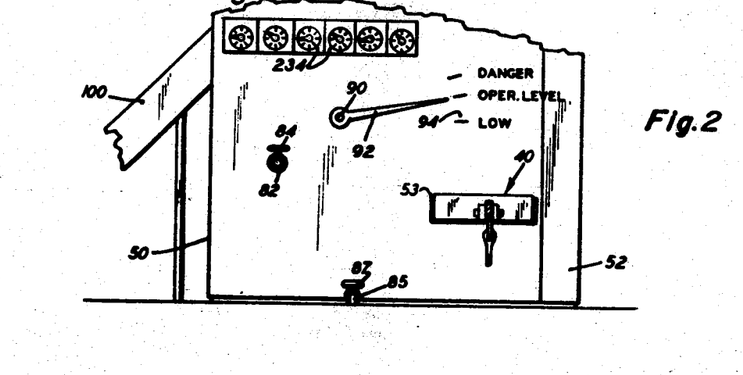
FIG. 2 is a fragmentary, side elevation view of the apparatus of FIG. 1.

The conveyor trough 40 has a short stroke in its drive by the drive 62 and advances the food products 20 to the right, as viewed in FIG. 1, through an exit opening 64 in the end of the enclosure 56, and drops the frozen food products and a sufficient quantity of the nitrogen gas to completely envelope the food products into a container (not shown) positioned below the righthand end of the conveyor trough for packaging. The still cold nitrogen gas drawn into the conduit 60 by a pump 63 (FIG. 13) is pumped into a heat exchanging device 66 through which cooling water 68 is sprayed and is cooled to a predetermined desired temperature. The water is supplied by a pipe 70 and a spray head 72, and is applied in a spray by a pipe 74 and spray heads 76 to the food products 20 in a trough 78 to pre-cool the food products prior to freezing thereof. Different heat exchange means may, of course, be employed to cool the pre-cooling water by the cold nitrogen gas. Some of the nitrogen gas is drawn from the device 66 by means of a pipe or conduit 80, is reliquified and again is supplied to the pool 28 as needed to replenish the pool. The remainder of the nitrogen gas is utilized in packaging the frozen food products to keep air and moisture from the packages. The liquid nitrogen is supplied to the tank 30 from a supply conduit 82 (FIGS. 1 to 3) under the control of a manually operable valve 84. A float 86 carried by an arm 88 keyed to shaft 90 turns a pointer 92 (FIG. 2) relative to a scale 94 to indicate the level of the liquid nitrogen in the open tank 30.

The pre-cooled food products are supplied to a distributor conveyor 95 having conveyor belt 96 from conveyors 98 and 100 (FIG. 4) and are diverted by deflectors or vanes 99, 101 and 102 as desired to belts 104 of the feed conveyors 22 and leading from the exterior of the enclosure 50 through openings 108 (FIG. 3) into the enclosure 50. If desired, chutes can be used in place of the feed conveyors 22. By means of the vanes 99, 101 and 102 (FIG. 4) and a partition 103, the conveyor 98 may feed one type of food product along one side of the conveyor belt 96 and the conveyor 100 feed food products to the other side of the belt 96. The vanes 102 may be set to discharge all of one type of product to the uppermost belts 104, as viewed in FIG. 4, and then the other food product will be transferred over adjacent to the other belts 104 positioned farther along the belt 96 and discharged thereonto. Then the food product of the one type is discharged into the pans 24, is frozen and is discharged into one side of the conveyor 40 and the other food product is received by the other pans 24, is frozen and is discharged into the other side of the conveyor 40. This is effected by selectively setting deflectors 110 (FIG. 3).

Each pan 24 (FIG. 3) includes vertical sidewalls 112, a vertical end wall 114 and a sloping discharge end wall 118 having a curved lip 120. Each sidewall 112 has a downwardly depending arm 122 mounted pivotally at its lower end, as viewed in FIG. 3, on a rod 124 and kept against movement along the rod by collars 126. The rod 124 is fixedly supported by the framework of the enclosure 50. Each sidewall 112 has a notch or recess 128 permitting movement of the pan 24 to the food product immersing position shown in full lines in FIG. 3. The sloping end wall 118 effects the discharge of the food products by gravity when the pan 24 is tilted to the broken line position thereof shown in FIG. 3, and acts as a chute.

Side guides 132 are provided for guiding the food products 20 along the feed conveyor 22, and pulleys 134 support and drive the belts 104. The outer pulleys 134 are driven individually by belts 136 driven by clutches 137. Each clutch includes a pulley 138 (FIG. 9) freely rotatable on shaft 140 and kept against longitudinal movement on the shaft by a collar 142 fixed to the shaft 140 and a spring 144 seated between a hub 146 of the pulley 138 and a clutch member 148 splined to the shaft 140. When a lever 150 is pivoted in a counterclockwise direction, as viewed in FIG. 9, a forked cam 152 thereof presses the clutch member 148 upwardly to move pins 154 between spokes 156 to drivingly engage the pulley 138 and drive the belt 136. The shaft 140 is journaled in bearings 160 (FIG. 4) carried by arms 162 fixed to the enclosure 50. The shaft 140 is driven by sprockets 164 and 166 and a chain 168 driven by an electric motor drive 170 mounted on the top of the enclosure 50. Each of the levers 150 is mounted pivotally on a pin 172 carried by a bracket 174 fixed on the top of the enclosure 50. Each lever 150 is driven by a pneumatic cylinder 176 connected to the lever 150 by a piston rod 178.

Each lever 36 is driven by a piston rod 180 (FIGS. 3, 4 and 10), which is driven by a piston (not shown) in a pneumatic cylinder 182 mounted pivotally by a clevis 184 on a bracket 186 fixed to the top of the enclosure 50. An elastic band 190 is fixed to the lever 36 and to a bar 192 mounted in a fixed position on the guides 54, and urges the lever 36 counterclockwise, as viewed in FIG. 3. Each lever 36 is mounted pivotally on a pin 196 carried by the enclosure 50 and has a disc portion 198 fitting closely within the opening 200 in the top of the enclosure 50 to seal the opening somewhat. Each disc portion 198 is loosely enough pivoted therein to permit free movement thereof. An air conduit 210 from a valve 212 is adapted to supply air under pressure to the lefthand end of the cylinder 182 to move the piston rod 180 to the right and swing the lever 36 in a clockwise direction from its full line immersing position, as shown in FIG. 3, to its broken line discharging position. A conduit 220 connects all of the valves 212 to a supply of air under pressure. Each of the valves 212 is operated by a solenoid 222. A spring 240 (FIG. 3) supports the free end of the cylinder 180 while permitting pivotal movement thereof.

Figure 10:
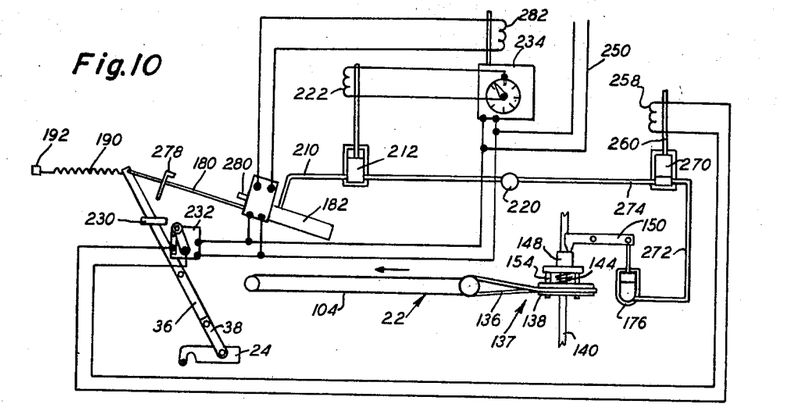
FIGS. 10, 11 and 12 are diagrammatic views of the apparatus of FIG. 1 showing the apparatus in different positions of operation thereof.
Figures 11, 12:
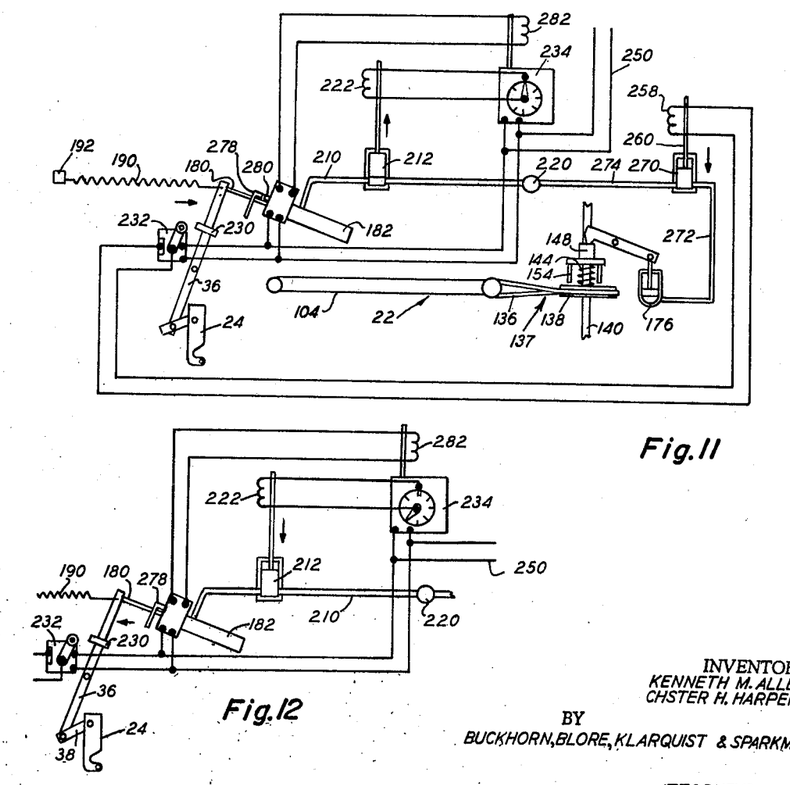
Figure 13:
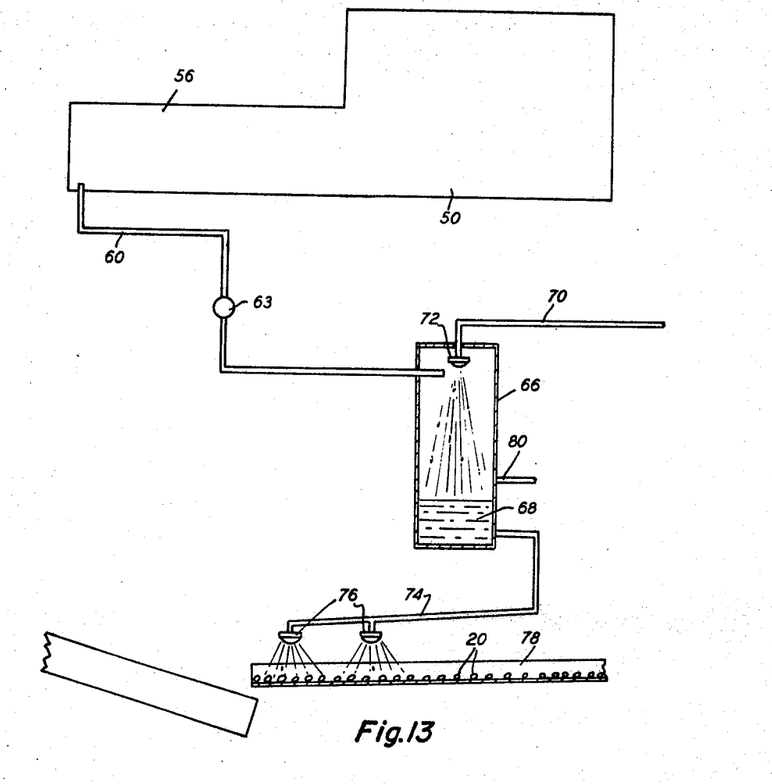
FIG. 13 is a fragmentary, schematic view of a portion of the apparatus of FIG. 1.

The operation of one of the units including one conveyor 22 and one pan 24 is illustrated in FIGS. 10, 11 and 12. In FIG. 10, the pan 24 is shown in the immersing or freezing position, and the conveyor 22 being driven to supply food products thereto, which occurs at the start of the freezing operation. The timer 234 is shown in a running condition, and is energized by a power line 250. When the timer times out, it closes a circuit to the solenoid 222 which then actuates the valve 212 to connect the conduit 210 to the conduit 220 from the supply of air under pressure, and air is supplied to the lefthand end of the cylinder 182, as viewed in FIG. 10, to pivot the lever 36 clockwise. This raises the pan 24 to its discharge position, as illustrated in FIG. 11, and immediately upon movement of the lever 36 to so move the pan 24, a switch actuator 230 actuates limit switch 232 to disconnect a solenoid winding 258 from the power line 250 to de-energize the winding 258. This drops out a solenoid plunger 260 to permit a spring pressed member 270 to move to a position closing conduit 272 from conduit 274 leading to the conduit 220 from the source of air under pressure. This permits the actuating lever 150 to be moved by the spring 144 to the position thereof shown in FIG. 11 and the clutch member 148 is disengaged from the pulley 138. This stops the drive of the conveyor 22.

When the lever 36 reaches its discharge position, an actuator 278 engages a momentary limit switch 280 and closes the switch 280 to connect a solenoid winding 282 to the power line 250. This energizes the winding 282 to reset the timer 234. The timer 234 then drops back to its zero or starting position. When the timer drops back to its starting position, the solenoid 222 is de-energized and the valve 212 recloses to disconnect the conduit 210 from the supply of air under pressure and connect the conduit 210 to exhaust. The band 190 then swings the lever 36 back from its discharge position to the immersing or freezing position, and, as the lever 36 is so moved the actuator 278 moves away from the switch 280 to drop out the solenoid 282. Also, as the lever 36 reaches its position in which the power portion of the pan 24 is immersed in the liquid nitrogen, the actuator 230 engages the switch 232 and recloses the circuit from the power line 250 to the solenoid winding 258. This re-energizes the solenoid winding 258 to pull the valve member 260 upwardly to a position supplying air under pressure to the cylinder 288 to cause engagement of the clutch member 144 with the pulley 138 to again start the drive of the conveyor belt 22.

While the conveyor belts 22 are driven throughout the time the lower portion of the pans associated therewith are immersed in the liquid nitrogen, to insure that all portions of the food products 20 are immersed in the liquid nitrogen for substantially the same length of time, the distributor conveyor 95 is controlled either manually or automatically to place a measured amount of the food products on each belt 104 for delivery to the pan associated therewith. The measured quantity of food products is preferably bunched on the belt 104 and is completely discharged into the pan 24 very quickly during the initial portion of the freezing period. As an alternative, each conveyor 22 may have the food product distributed over the surface thereof so as to provide a uniform weight per unit of length of the belt 104, and the timer 234 adapted to stop the belt 104 after a predetermined quantity of the food product has been discharged quickly into the pan 24 just after the pan has been immersed, after which the immersion is maintained for a predetermined period of time and the food product is discharged from the pan after the timer times out.

In a method forming a specific embodiment of the invention, strawberries were pre-cooled to from about 32° F. to about 40° F., were immersed in the liquid nitrogen for about 35 seconds to freeze them about half-way through, and then were post-cooled in the cold nitrogen gas for about 2 minutes to complete the freezing thereof and bring the temperature thereof to from about —30° F. to —40° F. The conveyor trough 40 agitated the strawberries sufficiently to continuously mix the gas to utilize its cooling effect efficiently. The gas pulled out of the conveyor trough 40 at the exit end thereof for cooling the pre-cooling water to about 32° F. was about —50° F.

To freeze raspberries, the raspberries were pre-cooled to from about 32° F. to 40° F., were immersed in the liquid nitrogen for about 6 to 7 seconds, and were post-cooled while agitated gently by the conveyor trough 40 for about 2 minutes. Oysters were quick frozen similarly by immersion for 40 seconds in liquid nitrogen, and post-cooled for about 2 minutes while agitated and in the cold nitrogen gas.

As illustrated in FIGS. 3 to 6, the partition 103 of the distributor conveyor 95 has openings 310 therein and is supported by crossbars 312 in positions just raised above the top of the belt 96. The deflectors 102 are movable between positions extending across portions of the conveyor belt 96 to direct food products through the openings 310 from which the products may be directed onto the conveyors 22 if desired, by selective positioning of the gates 101. The deflector 99 may be moved between a position deflecting all of the food products from the conveyor 98 to the lefthand portion of the conveyor 98, as viewed in FIG. 4, or may be positioned in a central position extending directly from the partition 104 to permit both sides of the conveyor belt 96 to be used to convey the food products from the conveyor 98. As an alternative, when the deflector 99 is in the full line position thereof shown in FIG. 4, all of the food products are supplied only to the lefthand portion of the conveyor belt 96. The food products from the conveyor 100 are conveyed along the righthand side of the conveyor belt 96, as viewed in FIG. 4, and may be selectively deflected by the deflectors 102 to the lefthand side of the conveyor and then deflected by the deflectors 101 to the conveyors 22, the first two of the conveyors 22 not being positioned to be supplied with food products from the conveyor 100, but all the rest of the conveyors 22 being positioned to be selectively supplied from the conveyor 100. The deflectors 99, 101 and 102 are adapted to be selectively set manually by an operator, but it is obvious that these deflectors may be set by an automatic control circuit when desired.

Figure 14:
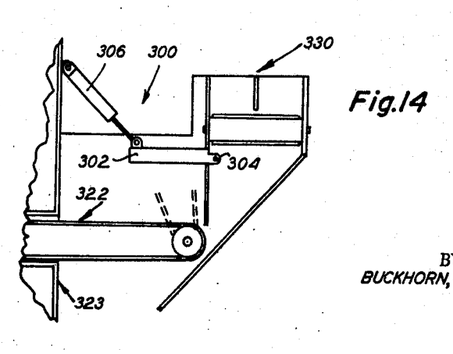
FIG. 14 is a fragmentary, schematic view of a portion of an apparatus forming an alternate embodiment of the invention.

In FIG. 14 there is shown a weighing device or accumulator 300 which controls the discharge of the food products to a conveyor 322 corresponding to one of the conveyors 22 so that the food products are discharge onto the conveyor 322 in a fairly closely bunched mass. The conveyor 322 then discharges the mass into an immersing pan in the enclosure 323 with very little difference in time from the immersion of the first portions thereof to the immersion of the last portions thereof. The device 300 includes an accumulating pan 302 pivoted on pin 304 and normally held in a raised accumulating position by a piston and cylinder device 306 under the control of a weighing mechanism (not shown). When the desired amount of food product has been accumulated on the pan 302, the device 306 pivots the pan 302 counterclockwise, as viewed in FIG. 14, to discharge the accumulated food products thereon onto the conveyor 322, and the conveyor 322 conveys the material into the immersing pan. A distributor conveyor 330 supplies food products to the accumulating pan 302, preferably under the control of the weighing mechanism.

The apparatus shown in FIGS. 15 to 18 forming an alternate embodiment of the invention serves, as does the apparatus shown in FIGS. 1 to 14, to drop food products 399 in a stream into a pool 398 of liquid nitrogen. In so dropping the food products, the products separate from each other and as the food products strike the boiling liquid nitrogen the food products are agitated by the boiling liquid to further separate them so that, when wet food products are being frozen, each separate particle of the food products is frozen separately and is not stuck to another particle. The apparatus of FIGS. 15 to 18 has a portable unit 400 and includes a highly insulated enclosure 401 mounted on base members 402 and including a top 404, ends 405, bottom 407 and front and rear doors 406 and 408 suspended respectively by trolleys 410 and 412 supported by tracks 414 and 416 carried by beams 418. The beams are supported by standards 420 in parallel positions above the top 404.

The portable unit 401 includes a pair of lightweight pans or containers 424 having arcuate, foraminous bottoms 426, flat front sides 428 forming discharge chutes, partially arcuate sides 430 blending with the bottoms 426 and vertical end walls 432 having notches 434 to provide clearance for dropping the food products from feed chutes 436 into the pans. The feed chutes are mounted in the end walls 405, and conveyors 440 which are not integral parts of the unit 401 advance the food products 399 to and drop each particle of the food product separately into the feed chutes along the bottoms of which the particles slide and drop separately into the pool of boiling liquid nitrogen. The upper end portions of the front sides 428 are brazed to tubular shafts 442 keyed to a wood shaft 444 projecting through end walls 405 and journaled in bearings 446 carried by the end walls. An open top, insulated tank 450 holds the pool 398 of liquid nitrogen and is supported in fixed position in the enclosure 401 by standards or legs 452 fixed to the bottom 407 of the enclosure.

After the food products 399 have been dropped into and immersed in the liquid nitrogen for a timer-controlled period of time, clutches 460 are actuated automatically by known controls 461 to connect a drive shaft 462 to cranks 464 to turn the cranks each through one revolution. The cranks 464 drive arms 466 through links 468 to sequentially oscillate the shaft 444 to move the pans 424 from their immersing positions shown in full lines in FIG. 16 to their dumping or discharge positions shown in broken lines in FIG. 16 to discharge the frozen particles of food products onto bed 470 of reciprocating conveyor 472 and then return the empty pans to their immersing positions. The conveyor 472 conveys the frozen food products on out of the unit 400 and discharges them into a conveyor 474 (FIG. 15) leading to a packaging station (not shown). Meanwhile, as soon as the pans are returned to their immersing positions, the conveyor belts 440 are actuated automatically by a known control circuit (not shown) including the controls 461 to advance rapidly measured quantities of chilled food products 399 into the feed chutes 436 to drop the particles thereof separately into the pool of liquid nitrogen to freeze these food products, as described above. The shaft 444 preferably is in two separate portions, one for each pan 424, and is individually rotatable so that, if desired, the two pans can be operated alternately, by alternately actuating the clutches 460 and drives of the conveyor belts 440. The clutches 460 and drives of the conveyor belts 440 can, of course, also be actuated simultaneously. The drive shaft 462 is driven continuously by a motor drive device 482 and is journaled by bearings 486 mounted on the top 404 of the enclosure 401. The drives of the conveyor belts 440 are synchronized with the actuation of the corresponding clutches 460, and the food products are spread in measured quantities or batches, preferably in single layer thicknesses with each food product separated slightly from the remainder, on spaced portions of the conveyor belts.

Figure 15:
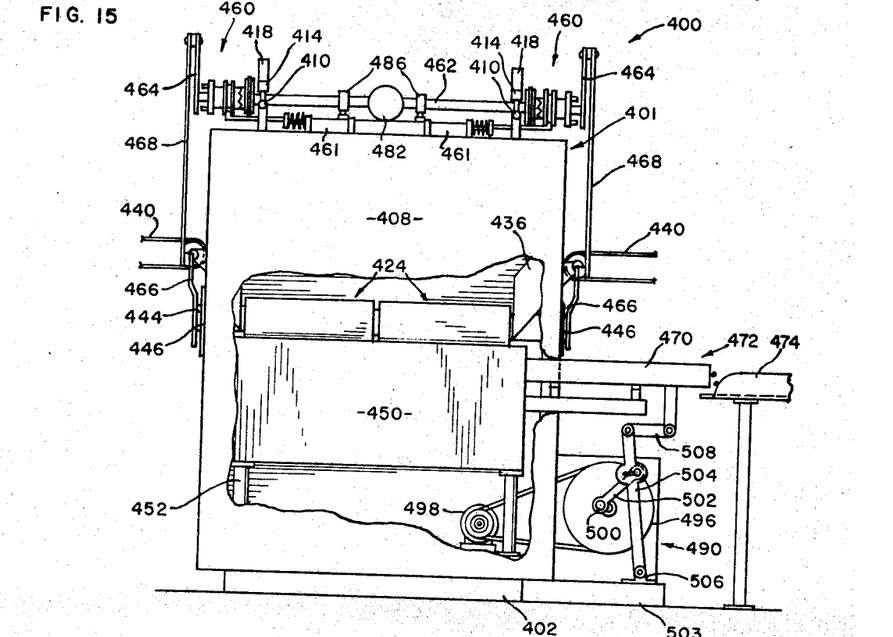
FIG. 15 is a fragmentary front elevation view of an apparatus forming an alternate embodiment of the invention.
Figure 16:
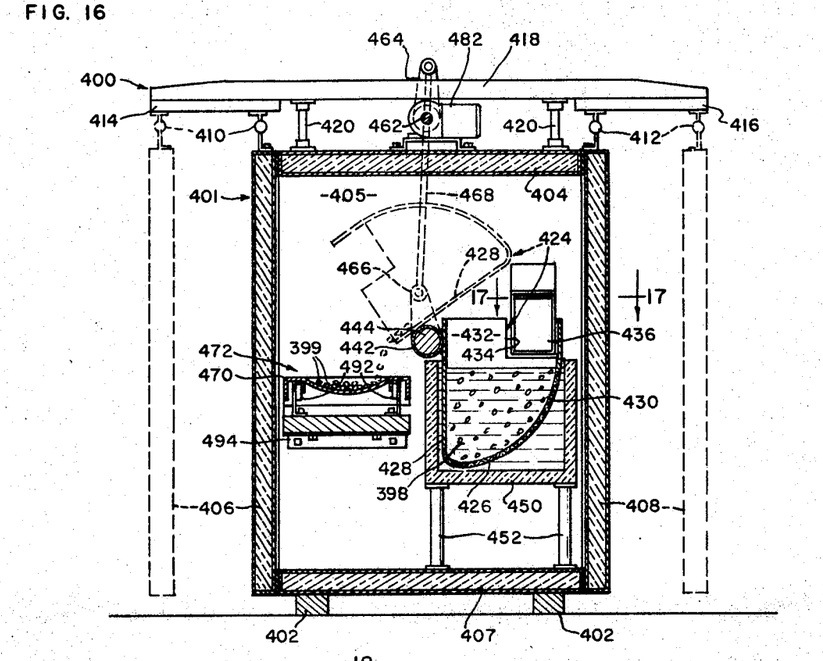
FIG. 16 is a vertical sectional view taken along line 16—16 of FIG. 15.
Figure 17:
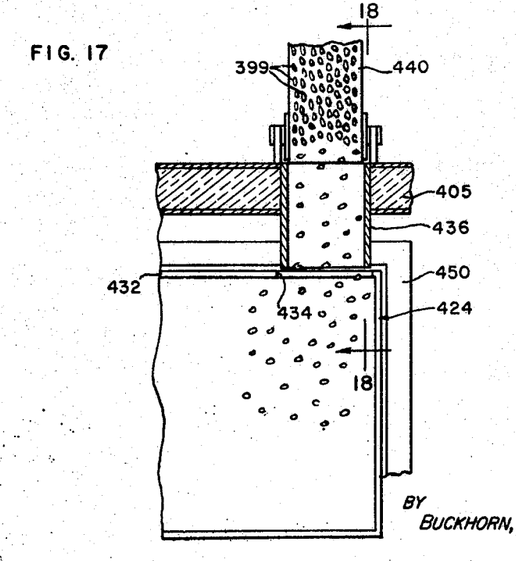
FIG. 17 is an enlarged, fragmentary, horizontal sectional view taken along line 17—17 of FIG. 16.
Figure 18:
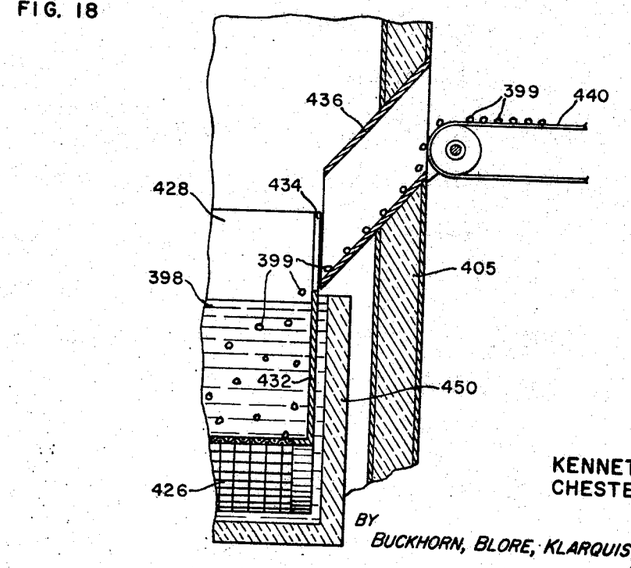
FIG. 18 is an enlarged, fragmentary, vertical sectional view taken along line 18—18 of FIG. 16.

A drive 490 of the conveyor 472 reciprocates the conveyor bed 470 along a track 492 supported by brackets 494 carried by the end walls 405 of the enclosure. The drive includes a flywheel 496 driven by motor 498 to rotate crank 500. The crank through link 502 oscillates lever 504 pivoted to bracket 506 fixed to base members 503 to reciprocate the conveyor bed 470 through link 508.

The food products, when completely or substantially completely separated from each other as they are dropped into the liquid nitrogen, cause the nitrogen to boil, which agitates them further to insure complete separation as the food products are frozen. This insures that the food products are not frozen to each other even though the products may be wet when dropped into the liquid nitrogen, since the wet exteriors are frozen and subsequent contact of the frozen food products does not cause adhesion. Since the food products are separate for substantially the full time of immersion, the extent of freezing is uniform and is not reduced as is the case where food products are immersed in large, unseparated masses, which is avoided to a great extent just by the dropping of the food products into the boiling liquid.

The above described methods and apparatus serve to simply and effectively freeze food products very quickly, without cracking or shattering the food products, and without danger to operators of the apparatus. With the methods and apparatus described above, the losses of nitrogen gas evaporated from the liquid nitrogen are minimized and the gases evaporating from the liquid nitrogen are flowed along and in the conveyor 40 and the differential temperature thereof is used to further freeze the food products as the food products are conveyed by the elongated conveyor 40. This efficiently utilizes a large portion of the cooling effect of the liquid nitrogen, and also speeds up the operation in that less immersion time is required to fully freeze the food products. The utilization of the still cold nitrogen gas after its travel along the conveyor 40 to cool the pre-cooling water is a further use of the cold nitrogen gas, and the recovery of the nitrogen gas and recooling thereof after the pre-cooling heat exchange is a further saving of the nitrogen gas. The above-described methods and apparatus are also very effective to freeze entire packages of food products, such as, for example, packages of asparagus and packages of shrimp.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of freezing food products comprising
dropping in a substantially free falling path discrete, solid, unfrozen, moist particles of food products into a body of a liquefied cryogenic gas maintained in an insulating enclosure,
freezing at least the outer surfaces of the particles while in the body and removing the particles from the body.

2. The method of claim 1 wherein the body is a relatively still pool.

3. The method of freezing food products comprising
applying a precooling liquid to discrete, solid, food particles to cool but not freeze the particles, whereby the particles are wetted,
dropping in a substantially free falling path the wetted discrete, solid, food particles while unfrozen into a body of a liquefied cryogenic gas to freeze the food particles,
and removing the particles from the body.

4. The method of claim 3 wherein the body is a relatively still pool.

5. The method of quick-freezing discrete solid food particles comprising
maintaining a body of a liquefied cryogenic gas liquid at substantially atmospheric pressure in an insulating enclosure,
introducing into the enclosure moist, discrete, solid food particles,
dropping the discrete solid food particles in a substantially free falilng path into the body to partially freeze the particles, whereby cold gas is evolved from the liquefied gas,
removing the particles from the body,
and flowing the cold gas over the removed particles to complete the freezing of the particles.

6. The method of claim 5 wherein the body is a relatively still pool.

7. The method of freezing discrete, solid food particles comprising
dropping in a substantially free falling path separated moist, discrete food particles into a body of a liquefied cyrogenic gas at substantially atmospheric temperature,
maintaining the particles in the body until outer portions of the particles are frozen, removing the particles from the body before the particles are frozen completely therethrough,
and further cooling the particles to freeze them completely therethrough.

8. The method of claim 7 wherein the body is a relatively still pool.

9. The method of quick-freezing food products comprising
applying a liquefied cryogenic gas to food products for a predetermined period of time to partially freeze the food products and form gaseous cold cryogenic gas,
removing the frozen food products from the liquefied gas,
placing the food products in an upwardly facing, reciprocating conveyor trough,
flowing the cold gas thus formed into and along the trough,
and advancing the food products along the trough while in contact with the cold gas.

10. The method of freezing food products comprising
maintaining a body of a liquefied cryogenic gas at approximately atmospheric pressure, placing food products in the pool to at least partially freeze the food products and form cold gas on the top of the body, removing the products in at least partially frozen condition from the body, placing the food products in a reciprocating, trough-like conveyor, and flowing the nitrogen gas into the conveyor from the top of the body.

11. The method of freezing food products comprising applying cold washing water to food products to wash and cool the food products, applying for a predetermined period of time a liquefied cryogenic gas at a temperature near the boiling point thereof to the washed and cooled food products to freeze the food products, whereby cold gas evaporates from the liquefied gas, and applying the cold gas to the washing water to cool the washing water.

12. The method of freezing a food product comprising applying a liquefied cryogenic gas to separated, unpackaged particles of food products to at least partially freeze the particles and form cold gas, placing the separated, unpackaged particles of the food products into a trough-like conveyor, flowing the cold gas into the conveyor, advancing the particles of the food product and the cold gas along the conveyor, and agitating the particles of the food products as the particles are advanced along the conveyor.

13. In an apparatus for freezing food products, a tank holding a supply of a liquefied cryogenic gas, a pan having a drain, means for holding a quantity of food products therein, means for lowering the pan into the liquefied gas to an immersing position in which it is adapted to receive and immerse food products, raising the pan to lift the food products out of the liquefied gas and tilt the pan to discharge the food products therefrom, means for dropping food products into the liquefied gas in the pan when the pan is in the immersing position thereof, and means for receiving the food products from the pan.

14. In an apparatus for freezing food products, a tank holding a supply of a liquefied cryogenic gas, a pan having drain means for holding a quantity of food products therein, means for lowering the pan into the liquefied gas to an immersing position in which it is adapted to receive and immerse food porducts, raising the pan to lift the food products out of the liquefied gas and tilting the pan to discharge the food products therefrom, means for dropping food products in unpackaged form into the pan while the pan is in its immersing position, means for receiving the food products from the pan and conveying the food products along a predetermined, elongated path, and means for flowing cold gas evaporated from the liquefied gas along the food products in the path.

15. In an apparatus for freezing food products, a tank holding a supply of a liquefied cryogenic gas, a pan having drain means for holding a quantity of food products therein, means mounting the pan pivotally on a fixed axis adjacent one edge thereof, and means for lowering the pan into the liquefied gas to an immersing position adapted to receive and immerse food products, raising the pan to lift the food products out of the liquefied gas and tilting the pan to discharge the food products therefrom.

16. In an apparatus for freezing food products, a tank holding a supply of a liquid cryogenic gas, a pan having drain means for holding a quantity of food products therein, means for lowering the pan into the liquefied gas to an immersing position in which it is adapted to receive and immerse food products, raising the pan to lift the food products out of the liquefied gas and tilting the pan to discharge the food products therefrom, means for dropping a stream of food products into the pan when the pan is in its immersing position, a trough-like conveyor for receiving the food products from the pan, and means for reciprocating the coveyor to advance the food products along a predetermined, elongated path and agitate the food products.

17. In an apparatus for freezing food products, a container open at the top and holding a pool of a liquefied cryogenic gas therein, a foraminous pan pivoted at one edge thereof on a fixed axis for movement between a horizontal position immersing food products therein in the pool of liquefied gas and a tilted position discharging food products therefrom, means for supplying food products to the pan, enclosure means enclosing the container and the pan and having an opening therein, actuating means for pivoting the pan and extending through the opening, and means positioned outside the enclosure means for driving the actuating means.

18. In an apparatus for freezing food products, a container open at the top and holding a pool of a liquefied cryogenic gas therein, a pan pivoted at one edge thereof on a fixed axis for movement between a generally horizontal position immersing food products therein in the pool of liquefied gas and a tilted position discharging food products therefrom, means for supplying food products to the pan, enclosure means enclosing the container and the pan, and means for pivoting the pan between the horizontal position and the tilted position.

19. In an apparatus for freezing food products, an enclosure, a pan, means mounting the pan in the enclosure for movement between an upwardly facing lower position and a raised discharge position, means for dropping unpackaged, separate particles of food products into the pan when the pan is in its lower position, means for maintaining a liquefied cryogenic gas in a pool so positioned that food products dropped into the pan when in its lower position are immersed in the liquefied gas, and means for moving the pan from the lower position thereof to the discharge position thereof to raise food products out of the liquefied gas and discharge the food products from the pan.

20. In an apparatus for freezing food products, an enclosure, a plurality of pans, means mounting the pans in side-by-side positions in the enclosure for individual pivotal movement between lower, upwardly facing positions and raised tilted positions, means for conveying food products from the exterior of the enclosure into the pans, means for maintaining a liquefied cryogenic gas in a pool so positioned that food products in the pans when the pans are in the lower, upwardly facing positions thereof are immersed in the liquefied gas, and means for moving the pans individually from the lower, upwardly facing positions thereof to the tilted positions thereof to raise food products out of the liquefied gas and discharge the food products from the pans.

21. In an apparatus for freezing food products,
a container holding a pool of a liquefied cryogenic gas with the top thereof at a predetermined height,
a pan having a foraminous bottom,
means mounting the pan for movement between a first position in which the pan faces upwardly and the lower portion of the pan is immersed in the liquefied gas and a second position in which the pan is raised above the pool to discharge therefrom food products contained in the pan,
drive means for moving the pan between the first and second positions thereof,
an enclosure enclosing the container and the pan and having an opening positioned above said height,
and conveyor means extending from the exterior of the enclosure to the opening to drop unpackaged food products into the pan when the pan is in the first position thereof.

22. In an apparatus for freezing food products,
means holding a pool of a liquefied cryogenic gas with the top thereof at a predetermined height,
a pan having a foraminous bottom,
means mounting the pan for pivotal movement between a first position in which the pan faces upwardly and the lower portion of the pan is immersed in the liquefied gas and a second position in which the pan is raised above the pool and is tilted to discharge therefrom food products contained in the pan,
first drive means for pivoting the pan between the first and second positions thereof,
an enclosure enclosing the holding means and the pan and having an opening positioned above said height,
conveyor means extending from the exterior of the enclosure through the opening to discharge food products into the pan when the pan is in the first position thereof,
second drive means for driving the conveyor means,
and timing means for controlling the second drive means to prevent operation thereof when the pan is not in the first position thereof.

References Cited

UNITED STATES PATENTS

| | | | |
|---|---|---|---|
| 1,933,257 | 10/1933 | Goosmann | 62—63 X |
| 2,263,452 | 11/1941 | Birdseye | 62—63 |
| 2,447,249 | 8/1948 | Hill | 62—63 |
| 2,484,297 | 10/1949 | Klein. | |
| 2,875,588 | 3/1959 | Berger | 62—74 |
| 3,022,636 | 2/1962 | Morrison | 62—64 |
| 3,039,276 | 6/1962 | Morrison | 62—64 X |
| 3,104,977 | 6/1963 | Morrison. | |
| 3,114,248 | 12/1963 | Morrison | 62—64 X |
| 3,162,019 | 12/1964 | Porter et al. | 62—67 X |
| 3,166,425 | 1/1965 | Morrison | 62—63 |
| 3,250,630 | 5/1966 | Webster et al. | 62—64 X |
| 3,294,553 | 12/1966 | Benson | 62—64 |

EDWARD J. MICHAEL, Primary Examiner

U.S. Cl. X.R.

62—374, 380